US008146056B1

(12) United States Patent
Liu et al.

(10) Patent No.: US 8,146,056 B1
(45) Date of Patent: Mar. 27, 2012

(54) DEBUGGING A COMPUTER PROGRAM BY INTERRUPTING PROGRAM EXECUTION IN RESPONSE TO ACCESS OF UNUSED I/O PORT

(75) Inventors: Yu Liu, Norcross, GA (US); Jason James Rohr, Stone Mountain, GA (US)

(73) Assignee: American Megatrends, Inc., Norcross, GA (US)

( * ) Notice: Subject to any disclaimer, the term of this patent is extended or adjusted under 35 U.S.C. 154(b) by 1676 days.

(21) Appl. No.: 11/196,878

(22) Filed: Aug. 4, 2005

(51) Int. Cl.
G06F 9/44 (2006.01)
G06F 11/00 (2006.01)
G06F 9/445 (2006.01)
G06F 9/45 (2006.01)

(52) U.S. Cl. ........ 717/124; 717/127; 717/129; 717/131; 714/34; 714/38.1; 714/38.14

(58) Field of Classification Search .................. None
See application file for complete search history.

(56) References Cited

U.S. PATENT DOCUMENTS

| 5,680,620 | A  | * | 10/1997 | Ross ........................... 717/129 |
| 6,052,801 | A  | * | 4/2000  | Hammond et al. ............. 714/38 |
| 6,385,663 | B2 | * | 5/2002  | Senator ......................... 719/325 |
| 6,708,326 | B1 | * | 3/2004  | Bhattacarya .................. 717/124 |
| 6,748,583 | B2 | * | 6/2004  | Aizenbud-Reshef et al. 717/127 |
| 7,574,585 | B1 | * | 8/2009  | Nekl et al. .................... 712/227 |
| 2002/0073400 | A1 | * | 6/2002 | Beuten et al. ................. 717/127 |
| 2004/0040013 | A1 | * | 2/2004 | Kalra ............................ 717/129 |

OTHER PUBLICATIONS

Product Profile, American Arium ECM-50 Emulator (2005).
Product Profile, American Arium TRC-20 Emulator (2005).

* cited by examiner

*Primary Examiner* — Lewis Bullock, Jr.
*Assistant Examiner* — Chris Nelson
(74) *Attorney, Agent, or Firm* — Hope Baldauff Hartman LLC

(57) ABSTRACT

A method, computer-readable medium, and apparatus for debugging a computer program utilizing breakpoints triggered by accessing a rarely used or unused I/O port is provided. Rarely used or unused I/O ports are identified in a computer system and a debugger program is instructed to halt program execution when an access is made to one or more of the identified ports. An instruction for writing to one of the ports is then inserted in the program to be debugged. When the instruction is executed, the debugger program will cause the execution of the program to stop. When the breakpoint is no longer needed, the debugger program is instructed not to halt when an access is made to the I/O port.

20 Claims, 4 Drawing Sheets

DEBUGGING A COMPUTER PROGRAM BY INTERRUPTING PROGRAM EXECUTION IN RESPONSE TO ACCESS OF UNUSED I/O PORT

TECHNICAL FIELD

The present invention is related to the debugging of computer programs. More particularly, the present invention is related to debugging computer programs utilizing program breakpoints triggered in response to accessing a rarely used or unused input/output port.

BACKGROUND OF THE INVENTION

One of the most important parts of the software development process is the process of debugging. Debugging refers to the process of identifying and eliminating errors within a software program. A debugging application program, called a debugger, provides tools to assist a programmer in locating and correcting program errors. For instance, most debuggers provide tools for stepping through the executing code of a program, monitoring the status of input/output ("I/O") ports, and for monitoring and modifying the contents of memory locations and central processing unit ("CPU") registers.

Traditionally, a debugger must be run directly on the computer system that is executing the software that is being debugged. This, however, greater hinders the software debugging process because the programmer performing the debugging must be in close proximity to the system being debugged. Other systems allow the debugging of one computer (the "target computer") through another computer (the "host computer") connected via an in-target probe ("ITP"). An ITP interfaces to the host computer and the target computer and utilizes a debugging program on the host computer to control the operation of code executing on the target computer. Through the ITP, the execution of program code executing on the target computer can be stepped through, the values of CPU registers and I/O ports can be read and written, and other debugging functions can be performed. An ITP is frequently used to debug system firmware, such as a basic input/output system ("BIOS") or extensible firmware interface ("EFI"), where an operating system is not available on the target system to execute a debugging program.

While current debugging programs and ITP packages make it easy to stop, start, and step through the execution of program code, current solutions do not provide a convenient solution for stopping program execution at an arbitrary point. Programmers currently utilize an instruction that causes the processor to enter an infinite loop at the desired breakpoint. On the AMD/INTEL processor platform, this instruction is the "JMP $" instruction. While use of the "JMP $" instruction does allow program execution to be halted at a specified point in the execution of the program, use of this instruction is very inconvenient. In particular, use of this instruction is very inconvenient in the debugging of BIOS programs because a new BIOS must be programmed (also referred to herein as "flashing") each time a "JMP $" instruction is to be added or removed from the program code. Moreover, the programmer must manually restart execution of the program at the instruction that immediately follows the "JMP $" in order to continue program execution. This process can be extremely time consuming for a BIOS programmer.

It is with respect to these considerations and others that the present invention has been made.

SUMMARY OF THE INVENTION

In accordance with the present invention, the above and other problems are solved by providing a method, computer-readable medium, and apparatus for debugging a computer program utilizing a breakpoint triggered by accessing a rarely used or unused I/O port. According to one aspect of the invention, rarely used or unused I/O ports are identified in a computer system and a debugger program is instructed to halt program execution when an access is made to one or more of the identified ports. An instruction for writing to one of the ports is then inserted in the program to be debugged. When the instruction is executed, the debugger program will cause the execution of the program to stop. When the breakpoint is no longer needed, the debugger program is instructed not to halt when an access is made to the I/O port. In this manner, it is not necessary to modify the program code being debugged when a breakpoint is no longer needed.

According to one method provided by an embodiment of the invention, one or more unused I/O ports are identified in a computer system. I/O ports are interfaces through which data may be written to or read from. I/O ports appear to a processor as one or memory locations that can be used to send or receive data. I/O ports may be used for both input and output, or dedicated solely to input or output. In most computer systems, some I/O ports are available that have not been assigned a particular function or that have been assigned a function but are rarely used. These I/O ports may be utilized by the embodiments of the invention to halt the execution of a computer program.

Once the one or more unused or rarely used I/O ports have been identified, one or more of the ports are designated as breakpoint ports. A breakpoint port is an I/O port that causes execution of a computer program to halt when the I/O port is accessed through either a read or write instruction. The execution of the computer program on the processor is then begun. If the program includes an instruction for accessing a breakpoint port, the execution of the program is halted at the instruction. A programmer may then examine the contents of memory, the processor registers, or perform other functions to debug the execution of the computer program. A request may also be received to resume execution of the program. In response to such a request, execution of the program is restarted at an instruction immediately following the instruction for accessing the breakpoint port. When the breakpoint is no longer needed, the designation of the I/O port as a breakpoint port is removed. Additionally, the instruction for accessing the I/O port may also be removed from the program when debugging has been completed.

According to another method provided by the embodiments of the invention, an instruction for accessing a rarely used or unused I/O port is inserted into a computer program being debugged. The I/O port is also designated at a debugger program as a breakpoint port which, when accessed, causes the debugger program to halt the execution of the computer program. The computer program is then executed under the control of the debugger program. The debugger program determines whether the instruction for accessing the breakpoint port has been executed and, if so, causes the execution of the computer program to be halted at the instruction.

While the execution is stopped, a programmer may examine the various memory locations or registers within the computer system to debug the execution of the program. Once this process has completed, the programmer may indicate to the debugger program that execution should resume. In response, the debugger program is operative to resume execution of the computer program at the instruction following the instruction for accessing the breakpoint port. Once the debugging process has concluded, the instructions for accessing the breakpoint port may be removed from the computer program. These instructions may also be left in the program, however, since they only access unused or rarely used I/O ports and should have no effect on the execution of the computer program.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
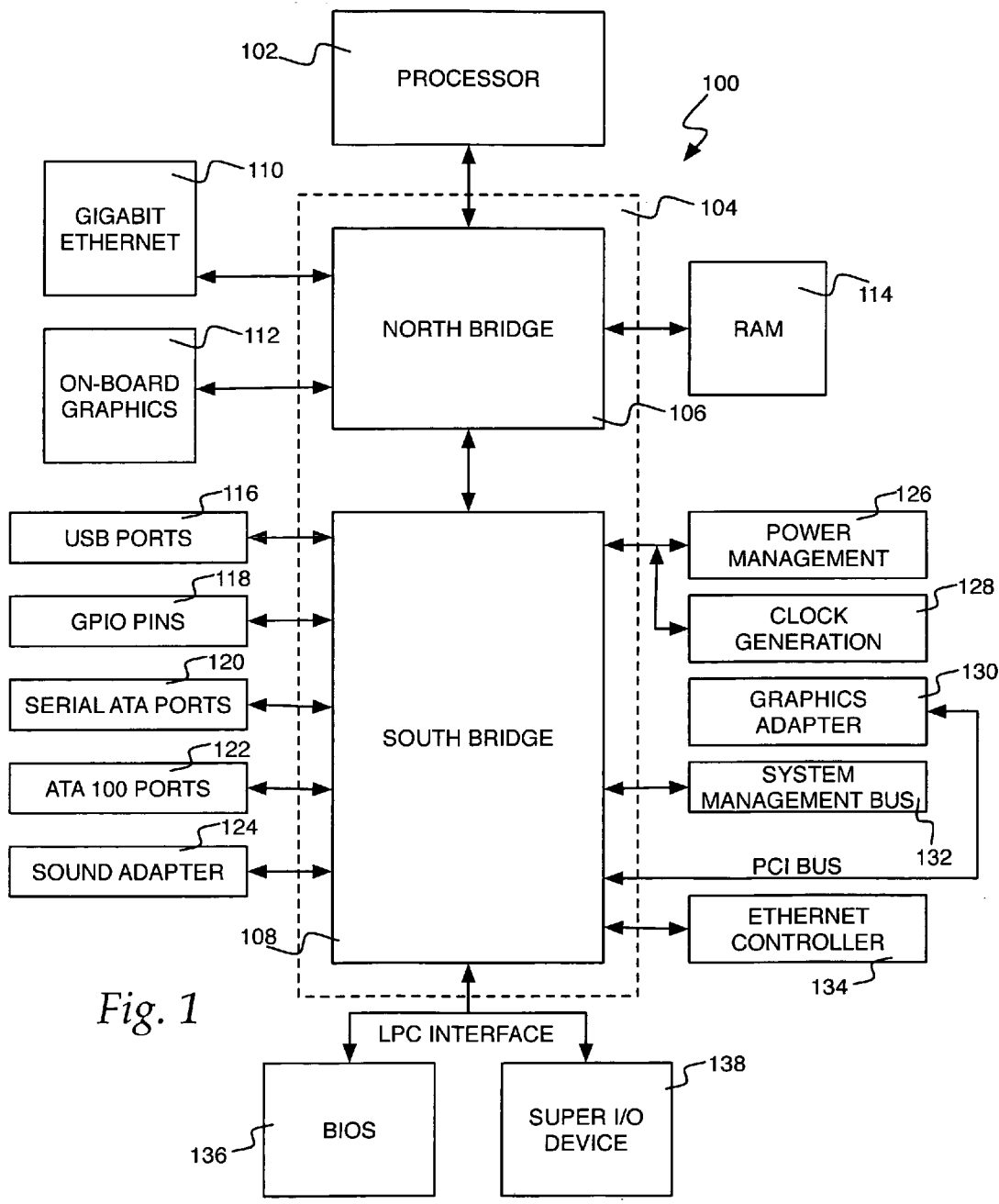
FIG. 1 is a computer architecture diagram showing aspects of a computer utilized as an illustrative operating environment for the various embodiments of the invention.

Embodiments of the present invention provide methods, systems, apparatus, and computer-readable media for debugging a computer program utilizing breakpoints triggered by accessing a rarely used or unused I/O port. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the invention will be provided. In particular, FIG. 1 illustrates a computer architecture for practicing the embodiments of the present invention. It should be appreciated, however, that although the embodiments of the invention described herein are discussed in the context of a conventional desktop or server computer, the embodiments of the invention may be utilized with virtually any type of computing device.

As described briefly above, the embodiments of the invention provide methods, systems, and apparatus for debugging a computer program utilizing breakpoints triggered by accessing a rarely used or unused I/O port. In one embodiment, a debugging application program is executed on a computer system that provides the functionality described herein. In another embodiment, a debugging application program is executed on a host computer that is connected to an in-target probe ("ITP"). The ITP is connected to a host computer that executes the software to be debugged. In this embodiment, the debugging application controls the ITP which, in turn, controls the target computer to provide the functionality described herein. The computer architecture illustrated in FIG. 1 may be utilized in either embodiment and as the basis for both a host computer and a target computer.

An illustrative computer architecture for practicing the various embodiments of the invention will now be described. In particular, a computer 100 is utilized that is operative to execute debugging software. In order to provide this functionality, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 122. The south bridge 108 may also provide a bus for interfacing peripheral card devices such as a graphics adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 that includes program code containing the basic routines that help to start up the computer 100 and to transfer information between elements within the computer 100. According to embodiments of the invention, the BIOS 136 is the program being debugged. In this regard, instructions for accessing a rarely used or unused I/O port of the computer 100 may be inserted into the BIOS 136 at points strategically identified to assist in the debugging of the BIOS 136. The execution of these instructions causes the execution of the BIOS 136 to be halted. Additional details regarding this process are provided below with respect to FIGS. 2-4.

According to embodiments of the invention, the computer 100 is operative to provide a number of I/O ports. I/O ports are interfaces through which data may be written to or read from. I/O ports appear to the processor 102 as one or more memory locations that can be used to send or receive data. I/O ports may be used for both input and output, or dedicated solely to input or output. In most computer systems, some I/O ports are available that have not been assigned a particular function or that have been assigned a function but are rarely used. These I/O ports may be utilized by the embodiments of the invention to halt the execution of a computer program as described herein.

In order to send data or receive data from an I/O port, the specific I/O port number must be specified. The I/O port number addresses a memory location that is part of an I/O device, but is not a part of system memory. Special assembler I/O instructions are utilized to signal a port access and send information to and from I/O devices. In microprocessors made by, or compatible with those made by, the INTEL CORPORATION, the instructions utilized to write and read I/O ports are the "OUT" and "IN" instructions, respectively. For instance, the instructions "OUT 0xa2, AL" cause a value to be written to the I/O port located at hexadecimal location "A2."

In computers that are considered PC-compatible, a number of I/O ports have been assigned for standard use. Outside of the standard port assignments, however, there are many ports that are unassigned or that are rarely used. For instance, in a PC-compatible computer there are many unused or rarely used ports in the address space "0x00-0xFF." In particular, the I/O ports located at "0xA2-0xB1" and "0xB3-0xBF" are either unused or rarely used. According to embodiments of the invention, these ports can be utilized to activate breakpoints in the execution of a computer program being debugged. Because there are many unused or rarely used I/O ports, there are many potential breakpoint triggers available for use in debugging. Moreover, because an eight bit value can be written to any of the I/O ports and utilized to identify the breakpoint, each unused or rarely used I/O port may define up to 256 available breakpoints. That is, the same I/O port may be utilized as different breakpoints by writing different values to the I/O port. When execution is halted, the written value can be read to determine exactly where code execution was interrupted. Additional details regarding this process are provided below with respect to FIGS. 2-4.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
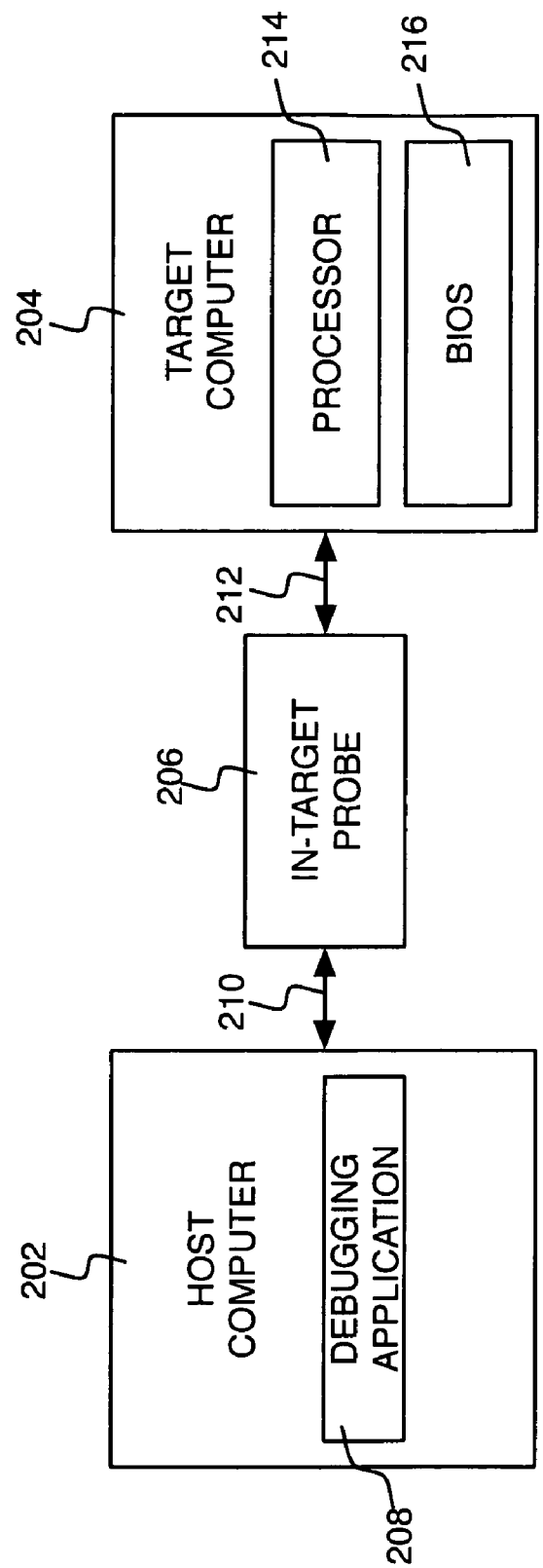
FIG. 2 is a block diagram illustrating the use of an in-target probe with a host and target computer system according to one embodiment of the invention.

Turning now to FIG. 2, additional details regarding an illustrative operating environment for the embodiments of the invention will be described. As shown in FIG. 1, a host computer 202 may be utilized to execute a debugging application program 208. The host computer 202 may utilize the computer architecture illustrated in FIG. 1 and described above. The debugger application 208 provides functionality for debugging the execution of a computer program executing on a target computer 204 through the use of an in-target probe ("ITP") 206. The ITP 206 is connected to the host computer 202 through a USB, serial, or other type of interface 210. The ITP 204 can control the operation of the target computer 204, including the starting and stopping of program code executing on the processor 214 of the target computer 204.

The ITP 206 is connected to the target computer 204 through a Joint Test Action Group ("JTAG") connector 212. The JTAG connector is also referred to an IEEE 1149.1 standard connector. In this regard, the target computer 204 has a JTAG port located on its motherboard for this purpose. The JTAG connector allows all of the chips on the motherboard to be accessed through the use of one connector. It should be appreciated that the target computer 204 may also utilize a computer architecture similar to the architecture illustrated in FIG. 1 and described above.

According to embodiments of the invention, the debugging program 208 is operative to permit one or more unused or rarely used I/O ports in the target computer 204 to be designated as breakpoint ports. Breakpoint ports are ports that cause the execution of program code on the target computer 204 to be interrupted when accessed through either a read or write operation. In this regard, the debugging program 208 may provide an interface through which a programmer may designate I/O ports as breakpoint ports. The programmer may also de-designate ports that were previously designated as breakpoint ports. In this regard, the I/O ports that should cause the execution to stop can be easily defined and redefined.

According to embodiments of the invention, the debugger application 208 may be utilized to debug a BIOS program 216 executing on the target computer 204. In this regard, instructions for accessing the breakpoint ports may be inserted into the BIOS program 216. When executed, these instructions cause the debugging application 208 and the ITP 206 to stop the execution of the BIOS program 216. The programmer can then examine the contents of memory, registers, and perform other functions to debug the operation of the BIOS program 216. The programmer may then instruct the debugging application 208 to resume execution of the BIOS program 216. In response thereto, the debugging program 208 and the ITP 206 cause the execution of the BIOS program 216 to resume at the instruction following the instruction that accessed the breakpoint port.

In order to avoid interrupting execution during the next execution phase, the debugging application 208 may be instructed to de-designate an I/O port as a breakpoint port. In this manner, execution will not be interrupted by the debugging application 208 the next time the instruction is encountered even though the instruction is still present. Alternatively, the instruction for accessing the breakpoint port may be removed from the BIOS program 216. This may be performed when debugging of the BIOS program 216 has been completed. Additional details regarding this process are provided below with respect to FIGS. 3-4.

Figure 3:
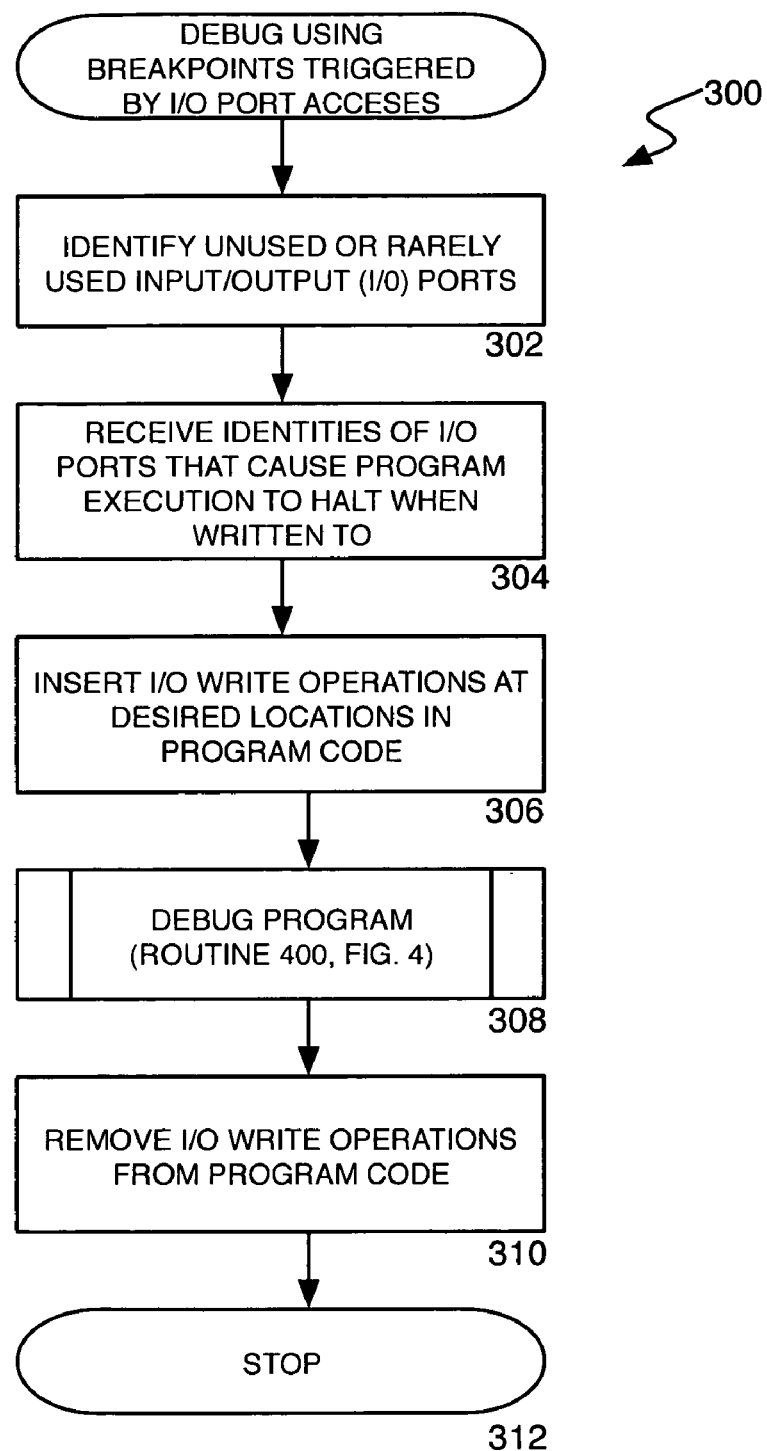
FIGS. 3-4 are flow diagrams illustrating methods provided by the embodiments of the invention for debugging a computer program utilizing breakpoints triggered by accessing rarely used or unused I/O ports.

Referring now to FIG. 3, additional details regarding the operation of the computer 202 for debugging a computer program utilizing breakpoints triggered by accessing rarely used or unused I/O ports will be described. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 3-4 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 300 begins at operation 302, where unused or rarely used I/O ports are identified in the particular computer architecture being utilized. As discussed above, the architecture utilized in most PC-compatible computers offers a multitude of unused or rarely used I/O ports. Other computer architectures also offer such unused or rarely used ports. From operation 302, the routine 300 continues to operation 304.

At operation 304, the I/O ports that should be utilized as breakpoint ports are designated within the debugging application 208. As discussed above, a list of breakpoint ports may be maintained by the debugging application 208 and an interface may be provided that allows a programmer to quickly designate that particular ports should or should not cause program execution to be halted. Once the breakpoint ports have been designated, the routine 300 continues to operation 306.

At operation 306, one or more instructions are inserted into the program to be debugged for accessing the breakpoint ports. As discussed above, the location of these instructions is a matter of choice for the programmer and is strategically chosen to provide data regarding particular debugging tasks. As also discussed above, according to embodiments, these instructions are inserted into a BIOS program 216 being debugged on a target computer 204. The routine 300 then continues from operation 306 to operation 308.

At operation 308, the debugging application 208 is utilized to debug the program. In particular, the debugging application 208 may be utilized to start and stop the execution of the processor 214, to examine memory locations within the computer 204, and to perform other functions. The debugging application 208 may also stop execution of the program upon encountering an instruction for accessing a breakpoint port. Additional details regarding this process are provided below with respect to FIG. 4.

From operation 308, the routine 300 continues to operation 310. At operation 310 the instructions inserted into the program being debugged for accessing the breakpoint ports are removed. It should be appreciated that leaving the instructions in the program code should not result in any adverse effects since the instructions only access rarely or unused I/O ports. However, in an abundance of caution, these instructions may be removed from a completed program. From operation 310, the routine 300 continues to operation 312, where it ends.

Figure 4:
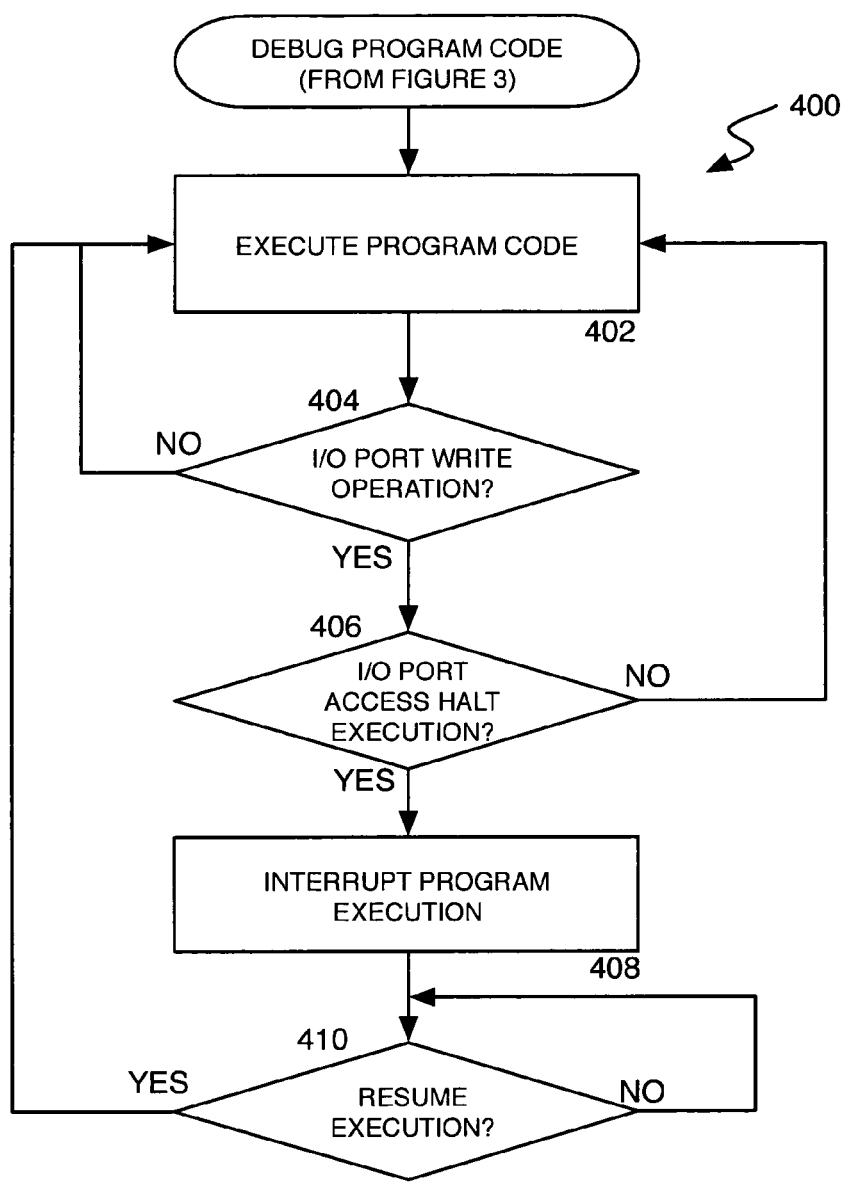

Referring now to FIG. 4, a routine 400 will be described providing additional details regarding the operation of the debugging application 208. In particular, the routine 400 begins at operation 402, where the debugging application 208 causes the processor 214 to execute the program code being debugged. In an embodiment, the program code is the BIOS program 216. From operation 402, the routine 400 continues to operation 404, where a determination is made by the debugging application 208 as to whether an instruction has been encountered for accessing an I/O port in the computer 204. If no such instructions have been encountered, the routine 400 branches back to operation 402, where execution of the program continues. If an instruction for accessing an I/O port has been encountered, the routine 400 continues to operation 406.

At operation 406, a determination is made by the debugging application 208 as to whether the instruction for accessing an I/O port is attempting to access an I/O port designated as a breakpoint port that should halt the execution of the program. If the access is not of a port designated as a breakpoint port, the routine 400 branches back to operation 402, where execution of the program continues. If the access is directed to a port designated as a breakpoint port, the routine 400 continues to operation 408 where execution of the program is halted. The debugging application 208 may then be utilized to examine memory, registers, the value of the data written to the I/O port, or other information useful in the debugging of the program. The routine 400 then continues to operation 410.

At operation 410, a determination is made by the debugging application 208 as to whether a request has been received to resume execution of the program. If such a request has not been received, the routine 400 branches back to operation 410, where execution remains halted. If a resume request is received, the routine 400 branches back to operation 402, where execution of the program continues.

It will be appreciated that embodiments of the present invention provide methods, systems, apparatus, and computer-readable medium for debugging a program utilizing breakpoints triggered by accessing a rarely used or unused I/O port in a computer system.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for debugging a computer program, the method comprising:
   executing a debugging application at a host computer in communication with a computer system;
   identifying, via the debugging application, one or more unused input/output ports of the computer system;
   designating, via the debugging application, one or more of the unused input/output ports as a breakpoint port which, when accessed, will cause the debugging application to interrupt execution of the computer program;
   controlling, via the debugging application, execution of the computer program on a central processing unit of the computer system;
   determining, with the debugging application, whether the central processing unit of the computer system has encountered an instruction for accessing a one of the breakpoint ports; and
   in response to determining that the central processing unit of the computer system has encountered the instruction for accessing the one of the breakpoint ports, interrupting execution of the computer program on the central processing unit via the debugging application.

2. The method of claim 1, further comprising:
   identifying one or more rarely used input/output ports in the computer system; and
   designating one or more of the rarely used input/output ports as a breakpoint port which, when accessed, will cause the debugging application to interrupt the execution of the computer program.

3. The method of claim 2, wherein accessing the one of the breakpoint ports comprises writing data to the input/output port designated by the breakpoint port.

4. The method of claim 2, wherein accessing the one of the breakpoint ports comprises reading data from the input/output port designated by the breakpoint port.

5. The method of claim 2, further comprising:
   instructing the central processing unit to resume execution of the computer program; and
   resuming execution of the computer program at the central processing unit.

6. The method of claim 5, wherein resuming execution of the computer program comprises beginning execution of the computer program at an instruction immediately after the instruction for accessing the one of the breakpoint ports.

7. The method of claim 6, further comprising de-designating one of the input/output ports as a breakpoint port via the debugging application, and removing the designation as a breakpoint port for the input/output port, in response to the de-designating.

8. The method of claim 7, comprising adding one or more instructions for accessing a breakpoint port to the computer program for debugging.

9. The method of claim 8, comprising removing the one or more instructions for accessing a breakpoint port from the computer program when debugging has been completed.

10. A method for debugging a computer program, the method comprising:
    executing a debugging application at a host computer that is communicatively linked with a computer system via an in-target probe (ITP);
    inserting into the computer program an instruction for accessing an unused or rarely used input/output port of the computer system;
    designating, via the debugging application, the input/output port as a breakpoint port which, when accessed, causes the debugging application to halt the execution of the computer program by a central processing unit of the computer system;
    executing the computer program at the central processing unit of the computer system under the control of the debugging application;
    determining, at the debugging application, whether the instruction for accessing the input/output port has been executed by the central processing unit of the computer system; and
    in response to determining that the instruction for accessing the input/output port has been executed, controlling the central processing unit of the computer system via the debugging application to halt the execution of the computer program.

11. The method of claim 10, wherein accessing the input/output port comprises writing data to the input/output port.

12. The method of claim 11, wherein accessing the input/output port further comprises reading data from the input/output port.

13. The method of claim 12, further comprising:
    determining, at the debugging application, whether a request to resume execution of the computer program has been received; and
    in response to determining that a request to resume execution of the computer program has been received, controlling the central processing unit of the computer system to resume execution of the computer program.

14. The method of claim 13, further comprising de-designating one of the input/output ports as a breakpoint port via the debugging application, and removing the designation as a breakpoint port for the input/output port, in response to the de-designating.

15. The method of claim 14, further comprising removing the one or more instructions for accessing the breakpoint port from the computer program when debugging has been completed.

16. A method for debugging a basic input/output system (BIOS) program executing on a central processing unit of a computer system using a debugging application executing on a host computer that communicates with the computer system via an in-target probe (ITP), the method comprising:
    executing the debugging application at the host computer;

executing the debugging application to insert into the BIOS program an instruction for accessing a rarely used or unused input/output port in the computer system;

designating, by way of a debugging application, the rarely used or unused input/output port as a breakpoint port which, when read from or written to by the central processing unit, will cause the debugging application to temporarily halt the execution of the BIOS program by the central processing unit;

executing the BIOS program under the control of the debugging application;

determining, by way of the debugging application, whether the instruction for accessing the rarely used or unused input/output port has been encountered by the central processing unit;

in response to determining that the instruction has been encountered, controlling the central processing unit via the debugging application to halt the execution of the BIOS program;

determining whether the debugging application has received a request to resume execution of the BIOS program at the computer system; and in response to determining that the request has been received, controlling the central processing unit via the debugging application to resume the execution of the BIOS program, the executing of the BIOS program being resumed by the central processing unit at an instruction immediately following the instruction for accessing the rarely used or unused input/output port in the computer system.

17. The method of claim 1, wherein the computer program comprises a basic input/output system (BIOS) program stored at the computer system, and wherein the method further comprises adding one or more instructions for accessing a breakpoint port to the BIOS program for debugging.

18. The method of claim 1, wherein the debugging application executing on the host computer communicates with the computer system via an in-target probe (ITP).

19. The method of claim 10, wherein the computer program comprises a basic input/output system (BIOS) program stored at the computer system.

20. The method of claim 19, further comprising adding one or more instructions for accessing a breakpoint port to the BIOS program for debugging.

* * * * *